US010570798B2

(12) United States Patent
Nakada et al.

(10) Patent No.: US 10,570,798 B2
(45) Date of Patent: Feb. 25, 2020

(54) EXHAUST PURIFICATION SYSTEM AND CATALYST REGENERATION METHOD

(71) Applicant: ISUZU MOTORS LIMITED, Tokyo (JP)

(72) Inventors: Teruo Nakada, Yokohama (JP); Takayuki Sakamoto, Fujisawa (JP); Daiji Nagaoka, Kamakura (JP); Hiroyuki Yuza, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 103 days.

(21) Appl. No.: 15/544,849

(22) PCT Filed: Jan. 18, 2016

(86) PCT No.: PCT/JP2016/051332
§ 371 (c)(1),
(2) Date: Jul. 19, 2017

(87) PCT Pub. No.: WO2016/117516
PCT Pub. Date: Jul. 28, 2016

(65) Prior Publication Data
US 2017/0350299 A1 Dec. 7, 2017

(30) Foreign Application Priority Data
Jan. 19, 2015 (JP) .................................. 2015-007988

(51) Int. Cl.
*F01N 3/00* (2006.01)
*F01N 3/02* (2006.01)
(Continued)

(52) U.S. Cl.
CPC ........... *F01N 9/00* (2013.01); *B01D 53/9409* (2013.01); *B01D 53/9422* (2013.01);
(Continued)

(58) Field of Classification Search
CPC ...... F01N 3/0842; F01N 3/085; F01N 3/0871; F01N 3/0885; F01N 3/20; F01N 2430/06;
(Continued)

(56) References Cited

U.S. PATENT DOCUMENTS 6,205,773 B1* 3/2001 Suzuki ................. F01N 3/0842
123/443
2010/0192543 A1 8/2010 Fujiwara et al.
(Continued)

FOREIGN PATENT DOCUMENTS

CN 101868607 A 10/2010
CN 102562227 A 7/2012
(Continued)

OTHER PUBLICATIONS

Machine Translation JP 2002-130008 Done Sep. 21, 2018.*
(Continued)

*Primary Examiner* — Patrick D Maines
*Assistant Examiner* — Dapinder Singh
(74) *Attorney, Agent, or Firm* — Procopio, Cory, Hargreaves & Savitch LLP (57) ABSTRACT

There is provided: a NOx occlusion reduction-type catalyst that is provided in an exhaust passage of an internal combustion engine, occludes NOx in exhaust when the exhaust is in a lean state, and reduces and purifies the occluded NOx when the exhaust is in a rich state; an exhaust injector that is provided in the exhaust passage and is positioned further upstream than the NOx occlusion reduction-type catalyst; a NOx-purging control unit that performs NOx purging of reducing and purifying the NOx occluded in the NOx occlusion reduction-type catalyst by lowering the exhaust to a prescribed target lambda by fuel injection by the exhaust injector; and a NOx-purging-prohibition processing unit that inhibits performance of the NOx purging in a case where the
(Continued)

exhaust cannot be lowered to the target lambda even if the fuel injection is performed at a maximum limit injection amount of the exhaust injector.

3 Claims, 7 Drawing Sheets (51) Int. Cl.
*F01N 3/08* (2006.01)
*F01N 3/20* (2006.01)
*F01N 9/00* (2006.01)
*F02D 41/02* (2006.01)
*F02D 41/12* (2006.01)
*F01N 3/36* (2006.01)
*B01D 53/94* (2006.01)
*B01D 53/96* (2006.01)
*F02D 41/24* (2006.01)
*F02D 41/00* (2006.01)
*F02D 41/22* (2006.01)
*F02D 41/14* (2006.01)
*F02D 41/18* (2006.01)
*F02D 41/04* (2006.01)
*F02D 41/40* (2006.01)

(52) U.S. Cl.
CPC .......... *B01D 53/96* (2013.01); *F01N 3/0842* (2013.01); *F01N 3/0871* (2013.01); *F01N 3/206* (2013.01); *F01N 3/36* (2013.01); *F02D 41/0275* (2013.01); F01N 2430/06 (2013.01); F01N 2610/03 (2013.01); F01N 2610/146 (2013.01); F01N 2900/0601 (2013.01); F01N 2900/1402 (2013.01); F02D 41/0007 (2013.01); F02D 41/0235 (2013.01); F02D 41/04 (2013.01); F02D 41/123 (2013.01); F02D 41/1454 (2013.01); F02D 41/1463 (2013.01); F02D 41/1495 (2013.01); F02D 41/182 (2013.01); F02D 41/22 (2013.01); F02D 41/2448 (2013.01); F02D 41/2454 (2013.01); F02D 41/405 (2013.01); F02D 2200/0614 (2013.01); F02D 2200/0802 (2013.01); F02D 2200/101 (2013.01); F02D 2200/602 (2013.01)

(58) Field of Classification Search
CPC .......... F01N 2900/08; F01N 2900/1402; F01N 2900/1612; F01N 2900/1614; F01N 2900/1622; F01N 2900/0412; F01N 2560/026; F01N 2560/27; F02D 41/3005; F02D 41/027; F02D 45/00; B01D 53/94; B01D 53/9422; B01D 53/9495; B01D 53/96
USPC .................. 60/274, 277, 286, 295, 299–301
See application file for complete search history.

(56) References Cited

U.S. PATENT DOCUMENTS

2012/0117947 A1* 5/2012 Gonze .................. F01N 3/0814
60/274
2012/0180454 A1 7/2012 Argolini et al.

FOREIGN PATENT DOCUMENTS

| EP | 1515014 A1 | 3/2005 |
|---|---|---|
| JP | 2000274279 A | 10/2000 |
| JP | 2002-188430 A | 7/2002 |
| JP | 2002-303128 A | 10/2002 |
| JP | 2005-146979 A | 6/2005 |
| JP | 2007-016713 A | 1/2007 |
| JP | 2002-130008 * | 5/2008 |
| JP | 2008-202425 A | 9/2008 |

OTHER PUBLICATIONS

International Search Report and Written Opinion for PCT App No. PCT/JP2016/051332 dated Mar. 15, 2016, 6 pgs.
First Chinese Office Action for CN App No. 201680006238.2 dated Oct. 25, 2018, 10 pages.
Extended European Search Report for related EP App No. 16740123.1 dated Sep. 20, 2018, 8 pgs.

* cited by examiner

EXHAUST PURIFICATION SYSTEM AND CATALYST REGENERATION METHOD

CROSS-REFERENCE TO RELATED APPLICATIONS

This application is a U.S. National Stage entry of PCT Application No. PCT/JP2016/051332, filed on Jan. 18, 2016, which claims priority to Japanese Patent Application No. 2015-007988, filed Jan. 19, 2015, the contents of which are incorporated herein by reference.

TECHNICAL FIELD

The present invention relates to an exhaust purification system and a catalyst regeneration method.

BACKGROUND ART

In related art, a NOx-occlusion-reduction-type catalyst has been known as a catalyst for reducing and purifying nitrogen compound (NOx) in exhaust which is emitted from an internal combustion engine. When the exhaust is in a lean atmosphere, the NOx-occlusion-reduction-type catalyst occludes NOx contained in the exhaust, and when the exhaust is in a rich atmosphere, the NOx-occlusion-reduction-type catalyst detoxifies and releases the occluded NOx with hydrocarbon contained in the exhaust by reduction and purification. For this reason, in a case where a NOx occlusion amount of the catalyst has reached a predetermined amount, it is necessary to periodically perform NOx purge of setting the exhaust in a rich state by exhaust pipe injection or post injection so as to recover a NOx occlusion capacity (for example, refer to Patent Documents 1 and 2).

PRIOR ART REFERENCE

Patent Reference

Patent Document 1: JP-A-2008-202425
Patent Document 2: JP-A-2007-16713

SUMMARY OF INVENTION

Problems to be Solved

In general, NOx purge is performed by setting a target fuel injection amount for lowering the exhaust to a desired lambda necessary for the purge and controlling fuel injection by an exhaust injector based on the set target fuel injection amount. However, since the exhaust injector has a maximum limit injection amount, in a case where the target fuel injection amount is set greater than the maximum limit injection amount, there is a possibility that the exhaust cannot be lowered to the desired lambda even though the exhaust pipe injection is performed. At this state, even if the NOx purge is performed, since the exhaust pipe injection comes to nothing, the fuel consumption is deteriorated.

An exhaust purification system and a catalyst regeneration method of the disclosure are to effectively suppress deterioration of fuel consumption by inhibiting performance of NOx purge in correspondence to a reachable lambda which is estimated from a maximum limit injection amount of an exhaust injector.

Means for Solving the Problems

The disclosure provides an exhaust purification system including: a NOx-occlusion-reduction-type catalyst that is provided in an exhaust passage of an internal combustion engine, occludes NOx in exhaust when the exhaust is in a lean state, and reduces and purifies the occluded NOx when the exhaust is in a rich state; an exhaust injector that is provided to the exhaust passage, is positioned further upstream than the NOx-occlusion-reduction-type catalyst, and injects fuel into the exhaust passage, catalyst regeneration means for performing catalyst regeneration processing of reducing and purifying the NOx occluded in the NOx-occlusion-reduction-type catalyst by lowering the exhaust to a predetermined target lambda at least by fuel injection by the exhaust injector; and inhibition means for inhibiting performance of the catalyst regeneration processing by the catalyst regeneration means in a case where the exhaust cannot be lowered to the target lambda even if the fuel injection is performed at a maximum limit injection amount of the exhaust injector.

Further, the disclosure provides an exhaust purification system including: a NOx-occlusion-reduction-type catalyst that is provided in an exhaust passage of an internal combustion engine, occludes NOx in exhaust when the exhaust is in a lean state, and reduces and purifies the occluded NOx when the exhaust is in a rich state; an exhaust injector that is provided to the exhaust passage, is positioned further upstream than the NOx-occlusion-reduction-type catalyst, and injects fuel into the exhaust passage, and a control unit, wherein the control unit operates so as to execute the following processing: catalyst regeneration processing of reducing and purifying the NOx occluded in the NOx-occlusion-reduction-type catalyst by lowering the exhaust to a predetermined target lambda at least by fuel injection by the exhaust injector; and inhibition processing of inhibiting performance of the catalyst regeneration processing by the catalyst regeneration means in a case where the exhaust cannot be lowered to the target lambda even if the fuel injection is performed at a maximum limit injection amount of the exhaust injector.

Further, the disclosure provides a catalyst regeneration method in an exhaust purification system including: an internal combustion engine; a NOx-occlusion-reduction-type catalyst that is provided in an exhaust passage of the internal combustion engine and occludes NOx in exhaust when the exhaust is in a lean state, and reduces and purifies the occluded NOx when the exhaust is in a rich state and an exhaust injector that is provided to the exhaust passage, is positioned further upstream than the NOx-occlusion-reduction-type catalyst, and injects fuel into the exhaust passage, the method including: catalyst regeneration processing of reducing and purifying the NOx occluded in the NOx-occlusion-reduction-type catalyst by lowering the exhaust to a predetermined target lambda at least by fuel injection by the exhaust injector; and inhibition processing of inhibiting performance of the catalyst regeneration processing by the catalyst regeneration means in a case where the exhaust cannot be lowered to the target lambda even if the fuel injection is performed at a maximum limit injection amount of the exhaust injector.

Effects of the Invention

According to the exhaust purification system and the catalyst regeneration method of the disclosure, it is possible to effectively prevent deterioration of fuel consumption by inhibiting performance of NOx purge in correspondence to the reachable lambda which is estimated from the maximum limit injection amount of the exhaust injector.

MODE FOR CARRYING OUT THE INVENTION

Hereinafter, an exhaust purification system according to an embodiment of the present invention will be described with reference to the accompanying drawings.

Figure 1:
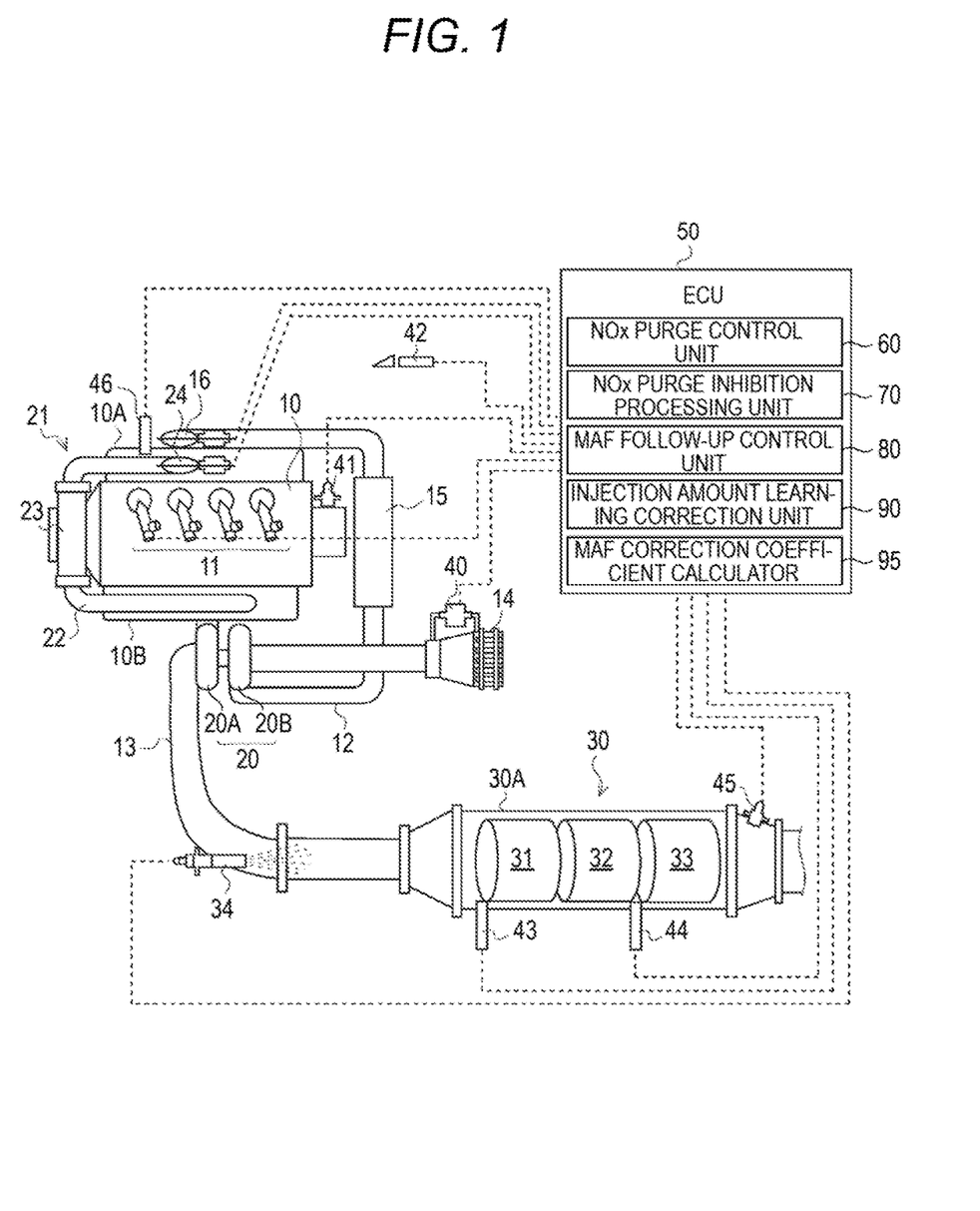
FIG. 1 is an overall configuration view depicting an exhaust purification system according to an embodiment.

As shown in FIG. 1, each cylinder of a Diesel engine (hereinafter, simply referred to as 'engine') 10 is provided with an in-cylinder injector 11 that directly injects high-pressure fuel accumulated to a common rail (not shown) into each cylinder. A fuel injection amount and fuel injection timing of each in-cylinder injector 11 are controlled in accordance with instruction signals that are input from an electronic control unit (hereinafter, referred to as 'ECU') 50.

An intake manifold 10A of the engine 10 is connected with an intake passage 12 for introducing therein fresh air, and an exhaust manifold 10B is connected with an exhaust passage 13 for discharging exhaust to an outside. The intake passage 12 is provided with an air cleaner 14, an intake air amount sensor (hereinafter, referred to as 'MAF (Mass Air Flow)' sensor) 40, a compressor 20A of a variable capacity-type supercharger 20, an intercooler 15, an intake throttle valve 16 and the like in corresponding order from an intake upstream side. The exhaust passage 13 is provided with a turbine 20B of the variable capacity-type supercharger 20, an exhaust after-treatment device 30 and the like in corresponding order from an exhaust upstream side. In the meantime, the engine 10 is mounted with an engine revolution sensor 41, an accelerator opening degree sensor 42 and a boost pressure sensor 46.

In the description of the embodiment, the MAF sensor 40 that measures and detects a mass flow rate (Mass Air Flow) is used as the sensor that measures and detects an intake air amount (intake flow rate (Suction Air Flow)) of the engine. However, a flow rate (air flow) sensor different from the MAF sensor 40 or a means replacing the flow rate sensor can also be used inasmuch as it can measure and detect the intake flow rate of the engine.

An EGR device 21 includes an EGR passage 22 that connects the exhaust manifold 10B and the intake manifold 10A with each other, an EGR cooler 23 that cools an EGR gas, and an EGR valve 24 that regulates an EGR amount.

The exhaust after-treatment device 30 includes an oxidation catalyst 31, a NOx-occlusion-reduction-type catalyst 32 and a particulate filter (hereinafter, simply referred to as 'filter') 33, which are arranged in a case 30A in corresponding order from the exhaust upstream side. Also, the exhaust passage 13 is provided with an exhaust injector 34 that is positioned further upstream than the oxidation catalyst 31 and injects unburnt fuel (mainly, hydrocarbon (HC)) into the exhaust passage 13 in accordance with an instruction signal input from the ECU 50.

The oxidation catalyst 31 is formed by carrying an oxidation catalyst component on a surface of a ceramic carrier such as a honeycomb structure, for example. When the unburnt fuel is supplied by exhaust pipe injection of the exhaust injector 34 or post injection of the in-cylinder injector 11, the oxidation catalyst 31 oxidizes the same to increase an exhaust temperature.

The NOx-occlusion-reduction-type catalyst 32 is formed by carrying alkali metal or the like on a surface of a ceramic carrier such as a honeycomb structure, for example. The NOx-occlusion-reduction-type catalyst 32 occludes NOx in the exhaust when the exhaust air-fuel ratio is in a lean state, and reduces and purifies the occluded NOx with a reducing agent (HC or the like) included in the exhaust when the exhaust air-fuel ratio is in a rich state.

The filter 33 is formed by arranging a plurality of cells, which are divided by a porous partition wall, along a flowing direction of the exhaust and alternately plugging upstream and downstream sides of the cells, for example. The filter 33 traps particulate matters (PM) in the exhaust in fine holes or surfaces of the partition wall, and when an estimated accumulation amount of the PM reaches a predetermined amount, so-called filter forced regeneration of combusting and removing the accumulated PM is performed. The filter forced regeneration is performed by supplying the unburnt fuel to the upstream oxidation catalyst 31 by the exhaust pipe injection or the post injection and increasing a temperature of the exhaust introduced to the filter 33 to a PM combustion temperature.

A first exhaust temperature sensor 43 is provided further upstream than the oxidation catalyst 31 and detects a temperature of the exhaust to be introduced into the oxidation catalyst 31. A second exhaust temperature sensor 44 is provided between the NOx-occlusion-reduction-type catalyst 32 and the filter 33, and detects a temperature of the exhaust to be introduced into the filter 33. A NOx/lambda sensor 45 is provided further downstream than the filter 33, and detects a NOx value and a lambda value (hereinafter, also referred to as 'air excess ratio') of the exhaust having passed through the NOx-occlusion-reduction-type catalyst 32.

The ECU 50 performs a variety of controls of the engine 10 and the like and includes a CPU, a ROM, a RAM, an input port, an output port and the like, which are well known. In order to perform the diverse controls, the ECU 50 is input with sensor values of the sensors 40 to 46. Also, the ECU 50 has, as some functional elements, a NOx purge control unit 60, a NOx purge inhibition processing unit 70, an MAF follow-up control unit 80, an injection amount learning correction unit 90 and an MAF correction coefficient calculator 95. The functional elements are included in the ECU 50, which is the integral hardware. However, some of the functional elements may be provided in separate hardware.

[NOx Purge Control]

The NOx purge control unit 60 is the catalyst regeneration means of the present invention, and performs catalyst regeneration processing of controlling at least one of an intake flow rate and a fuel injection amount to set the exhaust in the rich sate and to detoxify and release NOx, which is occluded in the NOx-occlusion-reduction-type catalyst 32, by reduction and purification, thereby recovering a NOx occlusion capacity of the NOx-occlusion-reduction-type catalyst 32 (hereinafter, performance of the processing is referred to as 'perform NOx purge control').

A "start request" of the NOx purge control is established in a case where a NOx emission amount per unit time is estimated from an operating state of the engine 10 and an estimated cumulative value ΣNOx obtained by cumulatively calculating the emission amounts exceeds a predetermined threshold value or in a case where a NOx conversion efficiency by the NOx-occlusion-reduction-type catalyst 32 is calculated from a NOx emission amount of a catalyst upstream side, which is estimated from the operating state of the engine 10, and a NOx amount of a catalyst downstream side, which is detected by the NOx/lambda sensor 45, and the NOx conversion efficiency becomes below a predetermined determination threshold value. When "start request" is established at a state where an inhibition flag $F_{Pro\_NP}$ (which will be described later in detail) is off, a NOx purge flag $F_{NP}$ for implementing the NOx purge control becomes on ($F_{NP}$=1) (refer to time $t_1$ in FIG. 2).

In the embodiment, the enriching of the exhaust by the NOx purge control is realized by concurrently using NOx purge lean control of lowering an air excess ratio from a value (for example, about 1.5) upon normal operation to a first target air excess ratio (for example, about 1.3) closer to a lean side than a theoretical air-fuel ratio equivalent value (for example, about 1.0) by air system control and NOx purge rich control of lowering the air excess ratio from the first target air excess ratio to a second target air excess ratio (for example, about 0.9) of a rich side by injection system control. Hereinafter, the NOx purge lean control and the NOx purge rich control are described in detail.

[NOx Purge Lean Control]

Figure 3:
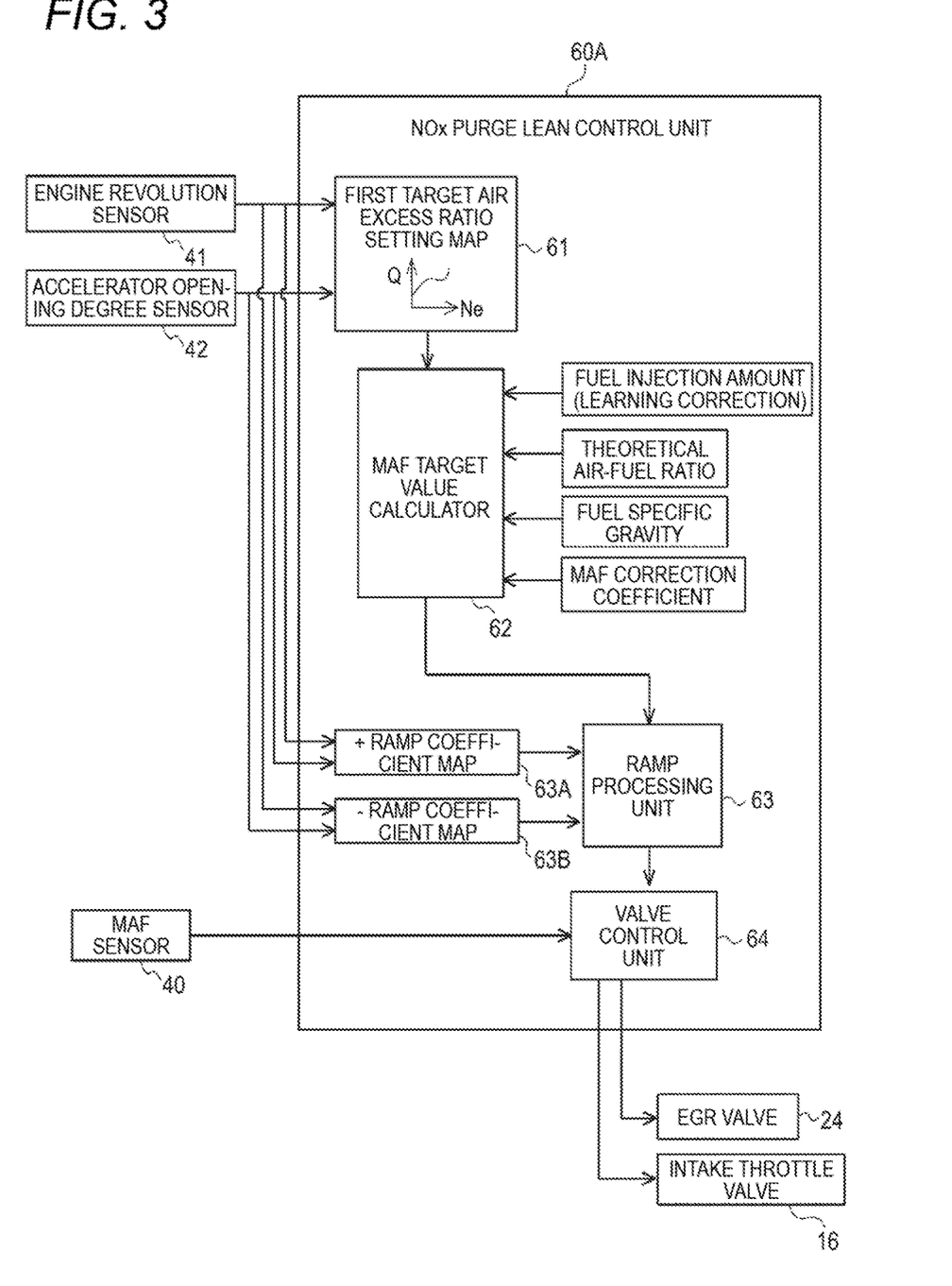
FIG. 3 is a block diagram depicting setting processing of an MAF target value that is to be used for NOx purge lean control according to the embodiment.

FIG. 3 is a block diagram depicting setting processing of an MAF target value $MAF_{NPL\_Trgt}$ that is to be performed by a NOx purge lean control unit 60A. A first target air excess ratio setting map 61 is a map that is to be referred to based on an engine revolution Ne and an accelerator opening degree Q, and an air excess ratio target value $\lambda_{NPL\_Trgt}$ (first target air excess ratio) upon NOx purge lean control corresponding to the engine revolution Ne and the accelerator opening degree Q is set in advance by a test and the like.

First, the air excess ratio target value $\lambda_{NPL\_Trgt}$ upon NOx purge lean control is read from the first target air excess ratio setting map 61, in response to the engine revolution Ne and the accelerator opening degree Q, which are input signals, and is then input to an MAF target value calculator 62. Also, the MAF target value calculator 62 calculates an MAF target value $MAF_{NPL\_Trgt}$ upon NOx purge lean control, based on an equation (1).

$$MAF_{NPL\_Trgt} = \lambda_{NPL\_Trgt} \times Q_{fnl\_corrd} \times Ro_{Fuel} \times AFR_{sto} / Maf_{\_corr} \qquad (1)$$

In the equation (1), $Q_{fnl\_corrd}$ indicates a fuel injection amount (the post injection is excluded) of the in-cylinder injector 11, which has been learning-corrected (which will be described later), $Ro_{Fuel}$ indicates a fuel specific gravity, $AFR_{sto}$ indicates a theoretical air-fuel ratio, and $Maf_{\_corr}$ indicates an MAF correction coefficient (which will be described later).

Figure 2:
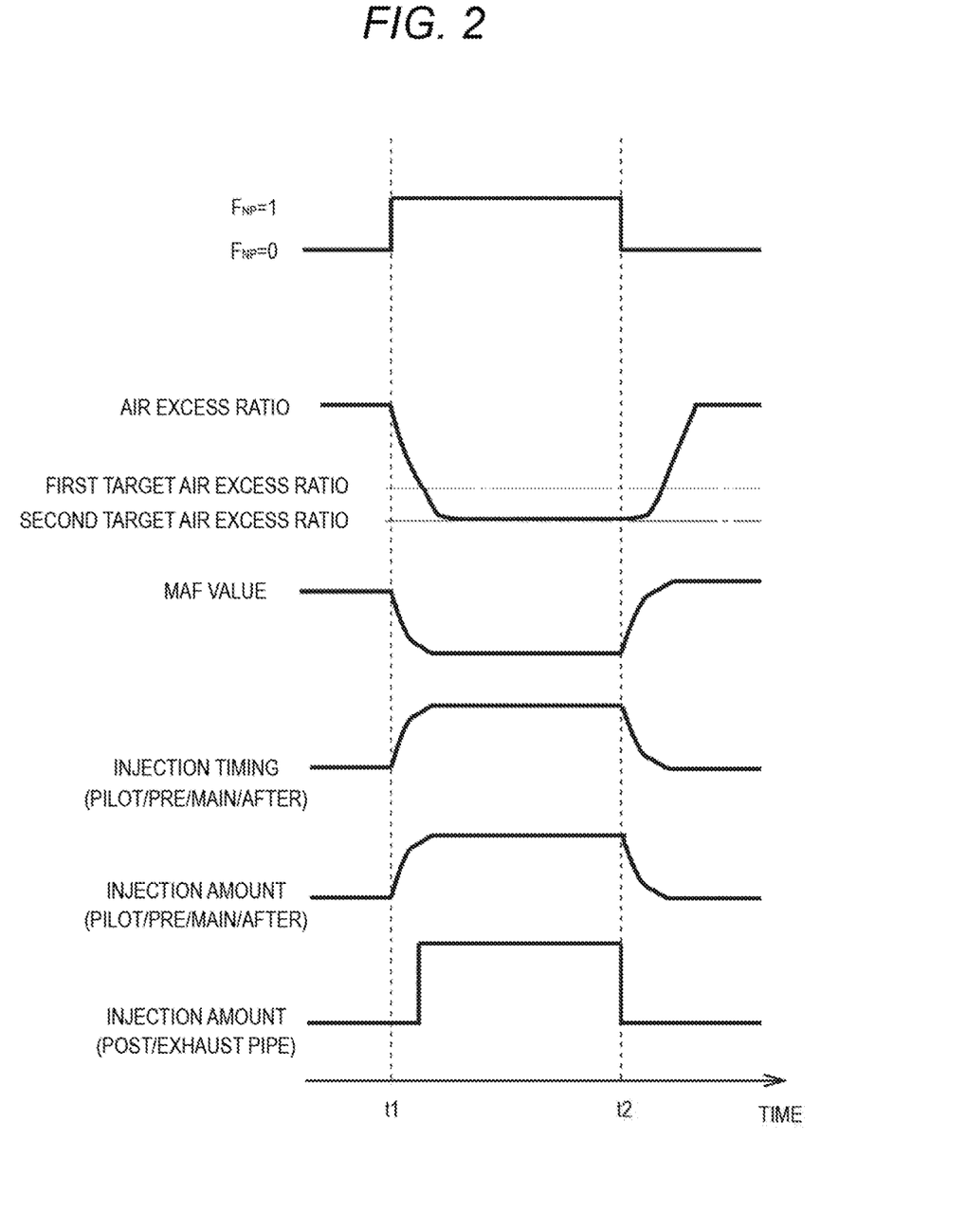
FIG. 2 is a timing chart diagram for illustrating NOx purge control according to the embodiment.

The MAF target value $MAF_{NPL\_Trgt}$ calculated by the MAF target value calculator 62 is input to a ramp processing unit 63 when the NOx purge flag $F_{NP}$ becomes on (refer to time $t_1$ in FIG. 2). The ramp processing unit 63 reads a ramp coefficient from a +ramp coefficient map 63A and a −ramp coefficient map 63B, in response to the engine revolution Ne and the accelerator opening degree Q, which are input signals, and inputs an MAF target ramp value $MAF_{NPL\_Trgt\_Ramp}$ to which the ramp coefficient is added to a valve control unit 64.

The valve control unit 64 executes feedback control of narrowing the intake throttle valve 16 towards a close side and widening the EGR valve 24 towards an open side so that an actual MAF value $MAF_{Act}$ input from the MAF sensor 40 becomes the MAF target ramp value $MAF_{NPL\_Trgt\_Ramp}$.

In this way, in the embodiment, the MAF target value $MAF_{NPL\_Trgt}$ is set based on the air excess ratio target value $\lambda_{NPL\_Trgt}$, which is to be read from the first target air excess ratio setting map 61, and the fuel injection amount of each in-cylinder injector 11, and the air system operation is controlled in the feedback manner based on the MAF target value $MAF_{NPL\_Trgt}$. Thereby, it is possible to effectively lower the exhaust to a desired air excess ratio necessary for the NOx purge lean control without providing a lambda sensor at an upstream side of the NOx-occlusion-reduction-type catalyst 32 or without using a sensor value of a lambda sensor even in a case where the lambda sensor is provided at the upstream side of the NOx-occlusion-reduction-type catalyst 32.

Also, since the fuel injection amount $Q_{fnl\_corrd}$ after the learning correction is used as the fuel injection amount of each in-cylinder injector 11, it is possible to set the MAF target value $MAF_{NPL\_Trgt}$ in the feed-forward control manner. Therefore, it is possible to effectively exclude influences such as aging degradation and characteristic change of each in-cylinder injector 11.

Also, the ramp coefficient, which is to be set in accordance with the operating state of the engine 10, is added to the MAF target value $MAF_{NPL\_Trgt}$, so that it is possible to effectively prevent accident fire of the engine 10 due to a rapid change in the intake air amount, deterioration of drivability due to torque variation, and the like.

[Setting of Fuel Injection Amount in NOx Purge Rich Control]

Figure 4:
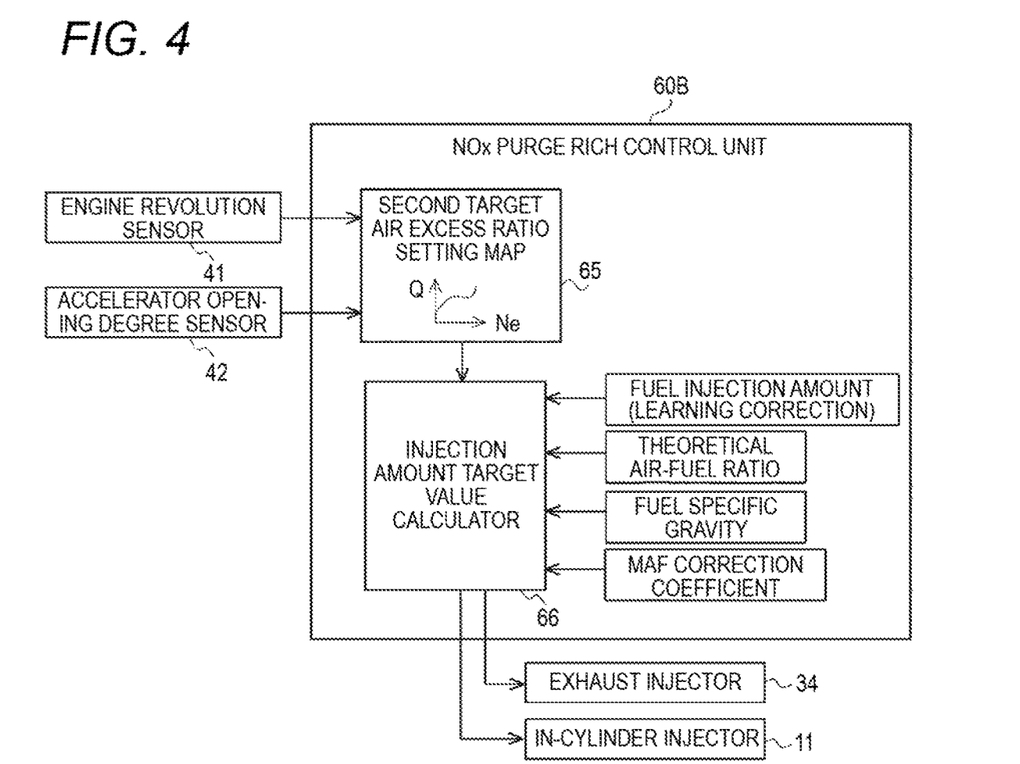
FIG. 4 is a block diagram depicting setting processing of a target injection amount that is to be used for NOx purge rich control according to the embodiment.

FIG. 4 is a block diagram depicting setting processing of a target injection amount $Q_{NPR\_Trgt}$ (injection amount per unit time) of the exhaust pipe injection or the post injection, which is to be performed by a NOx purge rich control unit 60B. A second target air excess ratio setting map 65 is a map that is to be referred to based on the engine revolution Ne and the accelerator opening degree Q, and an air excess ratio target value $\lambda_{NPR\_Trgt}$ (second target air excess ratio) upon NOx purge rich control corresponding to the engine revolution Ne and the accelerator opening degree Q is set in advance by a test and the like.

First, the air excess ratio target value $\lambda_{NPR\_Trgt}$ upon NOx purge rich control is read from the second target air excess ratio setting map 65, in response to the engine revolution Ne and the accelerator opening degree Q, which are input signals, and is then input to an injection amounts target value calculator 66. Also, the injection amount target value calculator 66 calculates a target injection amount $Q_{NPR\_Trgt}$ upon NOx purge rich control, based on an equation (2).

$$Q_{NPR\_Trgt} = MAF_{NPL\_Trgt} \times Maf_{\_corr} / (\lambda_{NPR\_Trgt} \times Ro_{Fuel} \times AFR_{sto}) - Q_{fnl\_corrd} \quad (2)$$

In the equation (2), $MAF_{NPL\_Trgt}$ is input from the MAF target value calculator 62, as a NOx purge lean MAF target value. Also, $Q_{fnl\_corrd}$ indicates a learning-corrected fuel injection amount (the post injection is excluded) of the in-cylinder injector 11 before an MAF follow-up control is applied, $Ro_{Fuel}$ indicates a fuel specific gravity, $AFR_{sto}$ indicates a theoretical air-fuel ratio, and $Maf_{\_corr}$ indicates an MAF correction coefficient (which will be described later).

The target injection amount $Q_{NPR\_Trgt}$ calculated by the injection amount target value calculator 66 is transmitted to the exhaust injector 34 or each in-cylinder injector 11, as an injection instruction signal, when the NOx purge flag $F_{NP}$ becomes on (refer to time $t_1$ in FIG. 2). The transmission of the injection instruction signal is continuously performed until the NOx purge flag $F_{NP}$ becomes off (refer to time $t_2$ in FIG. 2) by ending determination of the NOx purge control, which will be described later.

In this way, in the embodiment, the target injection amount $Q_{NPR\_Trgt}$ is set based on the air excess ratio target value $\lambda_{NPR\_Trgt}$, which is to be read from the second target air excess ratio setting map 65, and the fuel injection amount of each in-cylinder injector 11. Thereby, it is possible to effectively lower the exhaust to a desired air excess ratio necessary for the NOx purge rich control without providing a lambda sensor at the upstream side of the NOx-occlusion-reduction-type catalyst 32 or without using a sensor value of a lambda sensor even in a case where the lambda sensor is provided at the upstream side of the NOx-occlusion-reduction-type catalyst 32.

Also, the fuel injection amount $Q_{fnl\_corrd}$ after the learning correction is used as the fuel injection amount of each in-cylinder injector 11, so that it is possible to set the target injection amount $Q_{NPR\_Trgt}$ in the feed-forward control manner. Therefore, it is possible to effectively exclude influences such as aging degradation and characteristic change of each in-cylinder injector 11.

[Inhibition Processing of NOx Purge Control]

Figure 5:
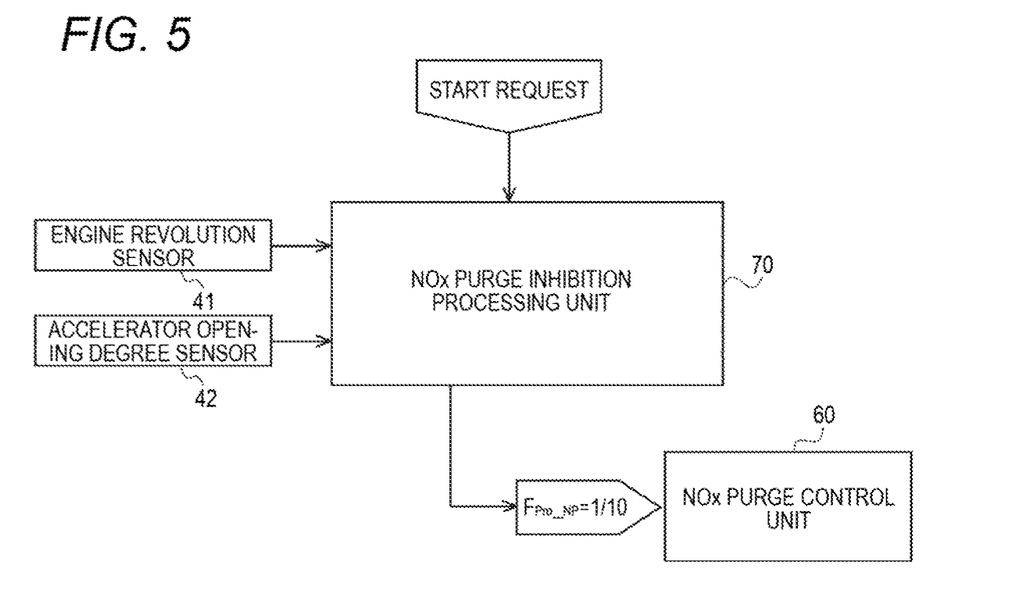
FIG. 5 is a block diagram depicting inhibition processing of NOx purge control according to the embodiment.

FIG. 5 is a block diagram depicting inhibition processing that is to be performed by the NOx purge inhibition processing unit 70. The NOx purge inhibition processing unit 70 is the inhibition means of the present invention and inhibits the performance of NOx purge control by setting the NOx purge inhibition flag $F_{Pro\_NP}$ to an on-state ($F_{Pro\_NP}=1$) if any one of following inhibition conditions (1) to (8) is satisfied.

(1) A case where the engine revolution Ne is greater than a predetermined upper limit revolution threshold value $Ne_{\_max}$.
(2) A case where the engine revolution Ne is smaller than a predetermined lower limit revolution threshold value $Ne_{\_min}$.
(3) A case where the fuel injection amount $Q_{fnl\_corrd}$ (the post injection is excluded) of the in-cylinder injector 11 is greater than a predetermined upper limit injection amount threshold value $Q_{\_max}$.
(4) A case where the fuel injection amount $Q_{fnl\_corrd}$ (the post injection is excluded) of the in-cylinder injector 11 is smaller than a predetermined lower limit injection amount threshold value $Q_{\_min}$.
(5) A case where the engine 10 is in a predetermined high load operating state and boost pressure feedback control (open loop control, in the case of the air system) is performed.
(6) A case where there is a possibility that the engine 10 is in a motoring state in which fuel injection is stopped immediately after NOx purge control starts.
(7) A case where an estimated reachable exhaust air excess ratio value $\lambda_{est\_max}$, which is estimated from a maximum limit injection amount $Q_{exh\_max}$ of the exhaust injector 34, is greater than an air excess ratio target value $\lambda_{NPR\_Trgt}$ (second target air excess ratio), which is set by the NOx purge rich control unit 60B.
(8) A case where a catalyst temperature of the NOx-occlusion-reduction-type catalyst 32 is lower than a predetermined catalyst activation temperature.

Hereinafter, the inhibition conditions (1) to (8) are described in detail.

Figure 6:
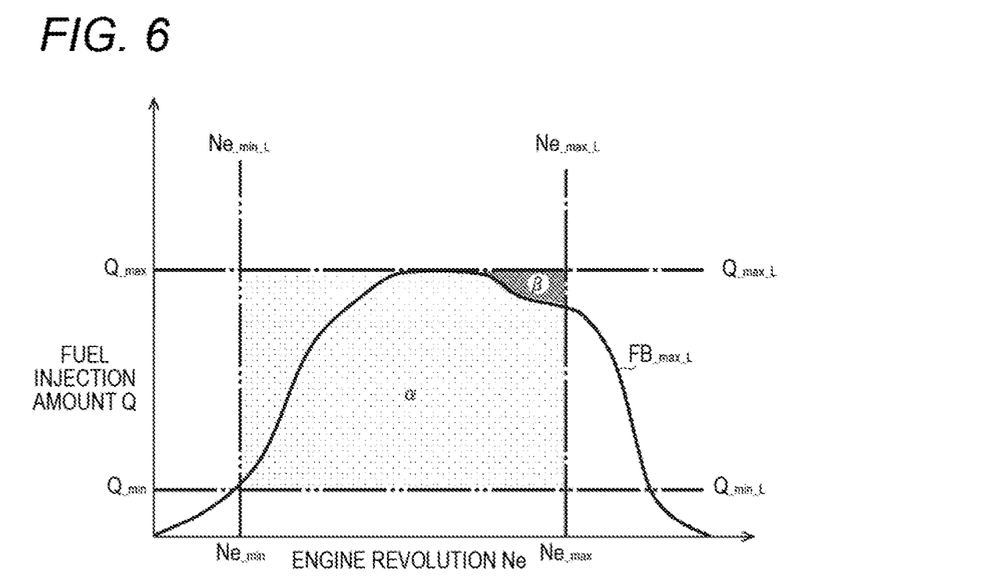
FIG. 6 depicts an example of an inhibition determination map according to the embodiment.

The inhibition conditions (1) to (4) are determined based on an inhibition determination map shown in FIG. 6, which is stored in advance in a memory of the ECU 50. The inhibition determination map is a two-dimensional map that is referred to based on the engine revolution Ne and the fuel injection amount Q (accelerator opening degree), and an upper limit revolution threshold value line $Ne_{\_max\_L}$, a lower limit revolution threshold value line $Ne_{\_min\_L}$, an upper limit injection amount threshold value line $Q_{\_max\_L}$, and a lower limit injection amount threshold value line $Q_{\_min\_L}$, which are acquired in advance by a test and the like, are set as fixed values (constant values). That is, a substantially rectangular region surrounded by the four upper and lower limit lines is set as a NOx purge permission region $\alpha$. In a case where the engine revolution Ne and the fuel injection amount Q deviate from the NOx purge permission region $\alpha$, the performance of NOx purge control is inhibited.

In this way, in the embodiment, in a case where the engine revolution Ne is greater than the upper limit revolution threshold value $Ne_{\_max}$ or in a case where the fuel injection amount of the in-cylinder injector 11 is greater than the upper limit injection amount threshold value $Q_{\_max}$, the performance of NOx purge control is inhibited, so that it is possible to effectively prevent a temperature of the engine front rapidly increasing. Also, in a case where the engine revolution Ne is smaller than the lower limit revolution threshold value $Ne_{\_min}$, the performance of NOx purge control is inhibited, so that it is possible to effectively prevent an increase in HC slip. Also, in a case where the fuel injection amount of the in-cylinder injector 11 is smaller than the lower limit injection amount threshold value $Q_{\_min}$, the performance of NOx purge control is inhibited, so that it is possible to securely suppress the useless performance of NOx purge control at a state where the exhaust lambda is difficult to be lowered. Thereby, it is possible to effectively prevent the deterioration of fuel consumption.

The inhibition condition (5) is also determined based on the inhibition determination map shown in FIG. 6, like the inhibition conditions (1) to (4). In the inhibition determination map, a boost pressure feedback control line $FB_{\_max\_L}$ is further set, in addition to the four upper and lower limit lines. In a region where the fuel injection amount Q is higher than the boost pressure feedback control line $FB_{\_max\_L}$, boost pressure feedback control (open loop control, in the case of the air system) of controlling an opening degree of a variable capacity-type supercharger 20 based on a sensor value of a boost pressure sensor 46 in a feedback manner is performed.

The boost pressure feedback control line $FB_{\_max\_L}$ is set at a high revolution-side of the engine so that the fuel injection amount Q gradually decreases as the engine revolution Ne increases, and at least part thereof is included in a high load region in the NOx purge permission region α. That is, a region β in which the boost pressure feedback control is performed is set in the NOx purge permission region α where the fuel injection amount Q is equal to or smaller than the upper limit injection amount threshold value $Q_{\_max}$. If the NOx purge control is performed in the region β, since the air system controls interfere with each other and an actual MAF cannot be matched with a target MAF value, an exhaust enriching injection amount may be inappropriate.

In the embodiment, since the region β where the actual MAF and the target MAF value are not matched is set as an inhibition region of the NOx purge control, it is possible to securely prevent the deterioration of fuel consumption and the excessive increase in temperature of the exhaust, which are caused when the exhaust enriching injection amount is inappropriate.

The inhibition condition (6) is determined based on a change in the fuel injection amount of the in-cylinder injector 11 when "start request" of the NOx purge control is established. More specifically, when "start request" of the NOx purge control is established, in a case where a conditional equation (3) where a total sum of the fuel injection amount $Q_{fnl\_corrd}$ of the in-cylinder injector 11 and a value obtained by multiplying an injection amount differential value ΔQ by a predetermined time constant K is smaller than zero (0) (a negative value) is satisfied, it is determined that the engine 10 will become the motoring state in a short time and the NOx purge control is thus inhibited.

$$Q_{fnl\_corrd} - \Delta Q \times K < 0 \qquad (3)$$

Like this, in a case where there is a possibility that the engine 10 becomes the motoring state immediately after the NOx purge control starts, the performance of NOx purge control is inhibited, so that it is possible to effectively prevent the useless fuel consumption.

The inhibition condition (7) is determined based on the maximum limit injection amount $Q_{exh\_max}$ of the exhaust injector 34, which is stored in advance in the memory of the ECU 50. More specifically, when "start request" of the NOx purge control is established, an estimated reachable exhaust air excess ratio value $\lambda_{est\_max}$ in a case where the NOx purge control is performed is calculated based on the maximum limit injection amount $Q_{exh\_max}$ of the exhaust injector 34, and in a case where the estimated exhaust air excess ratio value $\lambda_{est\_max}$ is greater than the air excess ratio target value $\lambda_{NPR\_Trgt}$ (second target air excess ratio) of the NOx purge rich control ($\lambda_{est\_max} > \lambda_{NPR\_Trgt}$), the performance of NOx purge control is inhibited.

In this way, in a case where it is not possible to lower the exhaust to the desired air excess ratio due to the limitation of the maximum limit injection amount $Q_{exh\_max}$ of the exhaust injector 34 even if the NOx purge control is performed, the performance of NOx purge control is inhibited, so that it is possible to effectively prevent the useless fuel consumption.

The inhibition condition (8) is determined based on an estimated catalyst temperature of the NOx-occlusion-reduction-type catalyst 32. The estimated catalyst temperature is estimated based on an inlet temperature of the oxidation sensor 31, which is detected at the first exhaust temperature sensor 43, exothermal reactions in the oxidation sensor 31 and the NOx-occlusion-reduction-type catalyst 32, and the like, for example, and in a case where the estimated catalyst temperature is lower than a predetermined catalyst activation temperature, the NOx purge control is inhibited.

In this way, when the catalyst temperature of the NOx-occlusion-reduction-type catalyst 32 is lower than the catalyst activation temperature, the NOx purge is inhibited, so that it is possible to effectively prevent white smoke.

[Ending Determination of NOx Purge Control]

In a case where any one of conditions that: (1) the injection amounts of the exhaust pipe injection or the post injection are cumulated from the on-state of the NOx purge flag $F_{NP}$ and the cumulated injection amount has reached a predetermined upper limit threshold value amount, (2) the elapse time measured from the start of the NOx purge control has reached a predetermined upper limit threshold value time; and (3) a NOx occlusion amount of the NOx-occlusion-reduction-type catalyst 32, which is calculated based on a predetermined model equation including, as input signals, an operating state of the engine 10, a sensor value of the NOx/lambda sensor 45 and the like, has been lowered to a predetermined threshold value indicative of NOx removal success; is satisfied, the NOx purge flag $F_{NP}$ is set to an off-state and the NOx purge control is over (refer to time $t_2$ in FIG. 2).

In this way, in the embodiment, the upper limits of the cumulated injection amount and the elapse time are provided with respect to the ending conditions of the NOx purge control, so that it is possible to securely prevent the fuel from being excessively consumed in a case where the NOx purge fails due to the decrease in the exhaust temperature and the like.

[MAF Follow-up Control]

The MAF follow-up control unit 80 executes MAF follow-up control of correcting a fuel injection timing and a fuel injection amount of each in-cylinder injector 11 in correspondence to MAF change during: (1) a switching time period from a lean state of normal operation to a rich state by the NOx purge control; and (2) a switching time period from the rich state by the NOx purge control to the lean state of normal operation.

[Injection Amount Learning Correction]

Figure 7:
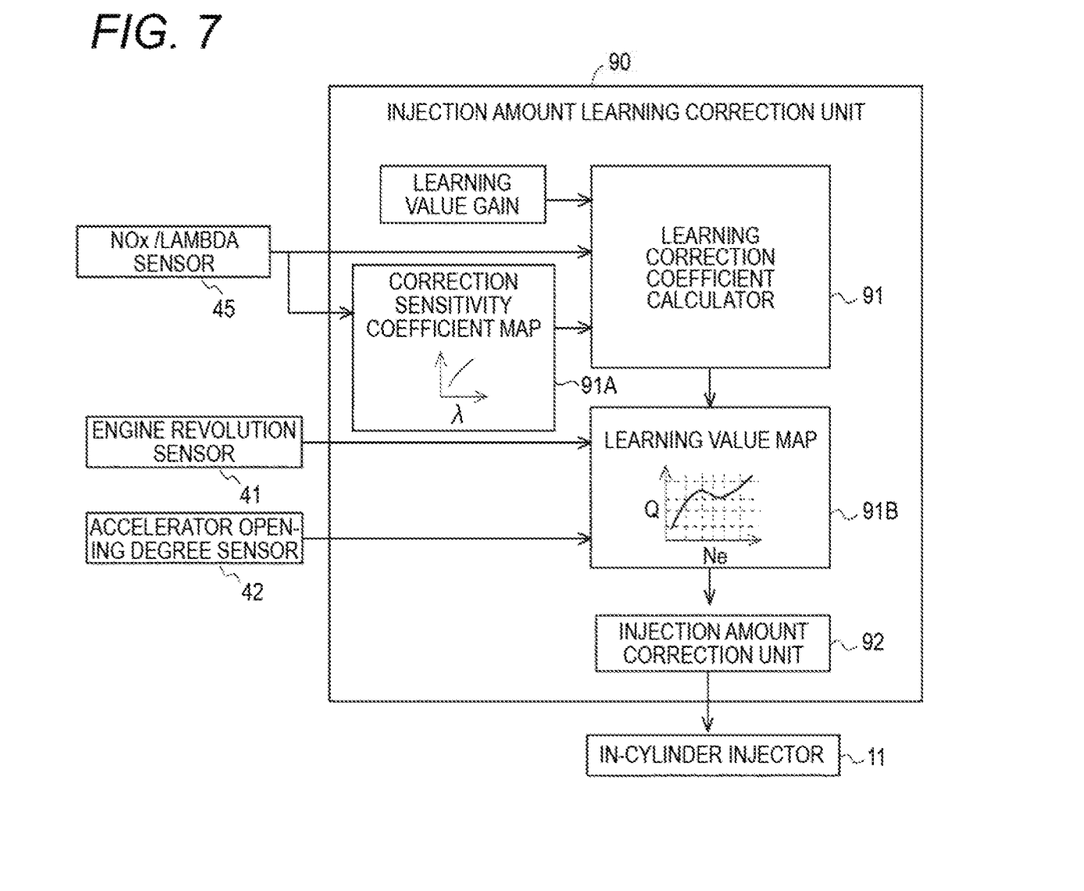
FIG. 7 is a block diagram depicting injection amount learning correction processing of an in-cylinder injector according to the embodiment.

As shown in FIG. 7, the injection amount learning correction unit 90 includes a learning correction coefficient calculator 91 and an injection amount correction unit 92.

The learning correction coefficient calculator 91 calculates a learning correction coefficient $F_{corr}$ of the fuel injection amount, based on an error Δλ between an actual lambda value $\lambda_{Act}$, which is to be detected by the NOx/lambda sensor 45 upon lean operation of the engine 10, and an estimated lambda value $\lambda_{Est}$. When the exhaust is in the lean state, an HC concentration in the exhaust is very small, so that a change in exhaust lambda value due to an oxidation reaction of HC in the oxidation catalyst 31 is negligible small. For this reason, it is thought that the actual lambda value $\lambda_{Act}$ in the exhaust, which passes through the oxidation catalyst 31 and is detected by the downstream-side NOx/lambda sensor 45, coincides with the estimated lambda value $\lambda_{Est}$ in the exhaust emitted from the engine 10. That is, in a case where the error Δλ occurs between the actual lambda value $\lambda_{Act}$ and the estimated lambda value $\lambda_{Est}$, it can be assumed that the error is caused due to a difference between an instructed injection amount to each in-cylinder injector 11 and the actual injection amount. Hereinafter, learning correction coefficient calculation processing, which is to be performed using the error Δλ by the learning correction coefficient calculator 91, is described with reference to a flowchart of FIG. 8.

Figure 8:
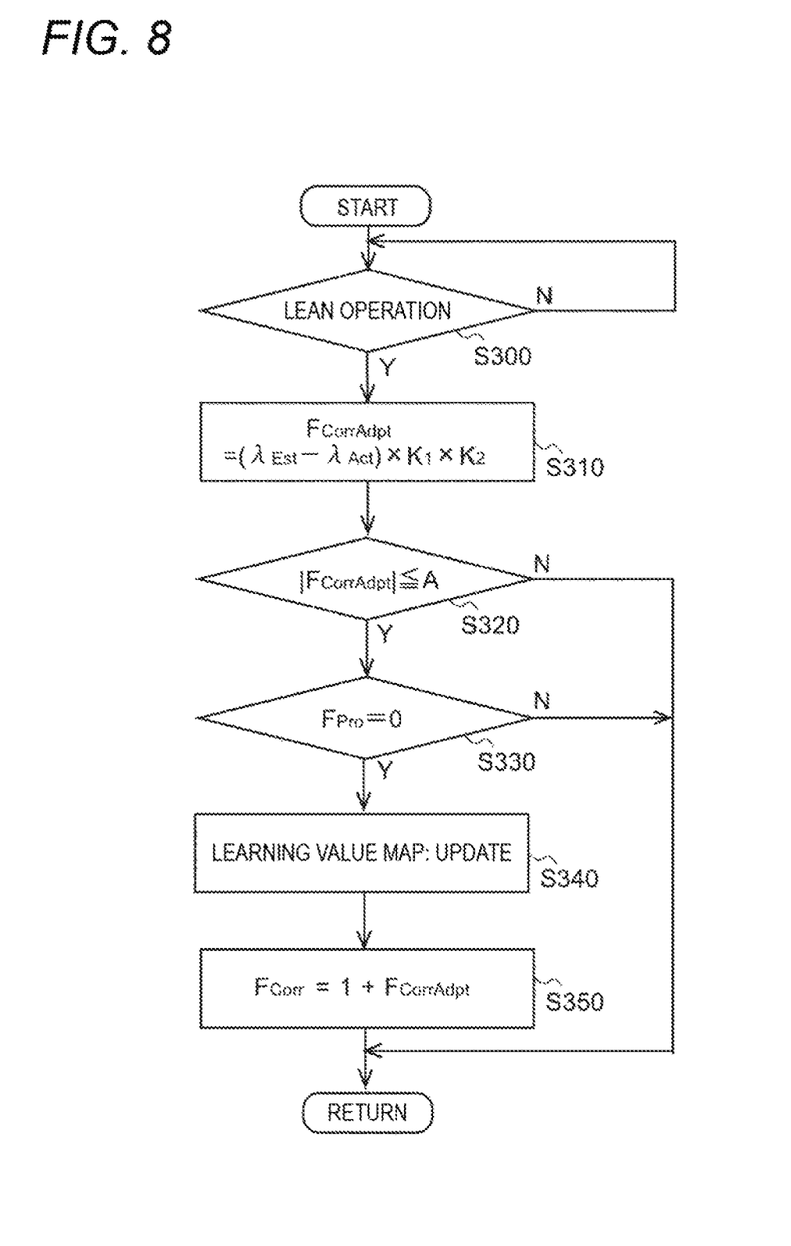
FIG. 8 is a flowchart depicting learning correction coefficient calculation processing according to the embodiment.

In step S300, it is determined whether the engine 10 is in a lean operating state, based on the engine revolution Ne and the accelerator opening degree Q. When it is determined that the engine is in the lean operating state, the learning correction coefficient calculator proceeds to step S310 so as to start learning correction coefficient calculation.

In step S310, a learning value $F_{CorrAdpt}$ is calculated ($F_{CorrAdpt}=(\lambda_{Est}-\lambda_{Act})\times K_1 \times K_2$) by multiplying the error $\Delta\lambda$, which is obtained by subtracting the actual lambda value $\lambda_{Act}$ detected at the NOx/lambda sensor 45 from the estimated lambda value $\lambda_{Est}$, by a learning value gain $K_1$ and a correction sensitivity coefficient $K_2$. The estimated lambda value $\lambda_{Est}$ is estimated and calculated from the operating state of the engine 10 corresponding to the engine revolution Ne and the accelerator opening degree Q. Also, the correction sensitivity coefficient $K_2$ is read from a correction sensitivity coefficient map 91A shown in FIG. 7, in response to the actual lambda value $\lambda_{Act}$ detected at the NOx/lambda sensor 45, which is an input signal.

In step S320, it is determined whether an absolute value $|F_{CorrAdpt}|$ of the learning value $F_{CorrAdpt}$ is within a range of a predetermined correction limit value A. In a case where it is determined that the absolute value $|F_{CorrAdpt}|$ exceeds the correction limit value A, the control returns and this learning is stopped.

In step S330, it is determined whether a learning inhibition flag $F_{Pro}$ is off. As the learning inhibition flag $F_{Pro}$, for example, a transient operation of the engine 10, the NOx purge control ($F_{NP}=1$) and the like are exemplified. The reason is that when the corresponding conditions are satisfied, the error $\Delta\lambda$ increases due to a change in the actual lambda value $\lambda_{Act}$, so that the correct learning cannot be performed. Regarding the determination as to whether the engine 10 is in the transient operation, based on a temporal change amount of the actual lambda value $\lambda_{Act}$ detected at the NOx/lambda sensor 45, in a case where the temporal change amount is greater than a predetermined threshold value, it may be determined that the engine is in the transient operation.

In step S340, a learning value map 91B (refer to FIG. 7), which is referred to based on the engine revolution Ne and the accelerator opening degree Q, is updated to the learning value $F_{CorrAdpt}$ calculated in step S310. More specifically, in the learning value map 91B, a plurality of learning regions divided in correspondence to the engine revolution Ne and the accelerator opening degree Q is set. The learning regions are preferably set to be narrower as use frequencies thereof are higher and to be wider as use frequencies thereof are lower. Thereby, the learning accuracy is improved in the region of which use frequency is high and it is possible to effectively prevent the non-learning in the region of which use frequency is low.

In step S350, in response to the engine revolution Ne and the accelerator opening degree Q, which are input signals, "1" is added to the learning value read from the learning value map 91B, so that a learning correction coefficient $F_{Corr}$ is calculated ($F_{Corr}=1+F_{CorrAdpt}$). The learning correction coefficient $F_{Corr}$ is input to the injection amount correction unit 92 shown in FIG. 7.

The injection amount correction unit 92 multiplies respective basic injection amounts of pilot injection $Q_{Pilot}$, pre-injection $Q_{Pre}$, main injection $Q_{Main}$, after-injection $Q_{After}$ and post injection $Q_{Post}$ by the learning correction coefficient $F_{Corr}$, thereby correcting the fuel injection amounts.

In this way, the fuel injection amount to each in-cylinder injector is corrected by the learning value corresponding to the error $\Delta\lambda$ between the estimated lambda value $\lambda_{Est}$ and the actual lambda value $\lambda_{Act}$, so that it is possible to effectively exclude the non-uniformity such as aging degradation, characteristic change, individual difference and the like of each in-cylinder injector 11.

[MAF Correction Coefficient]

Figure 9:
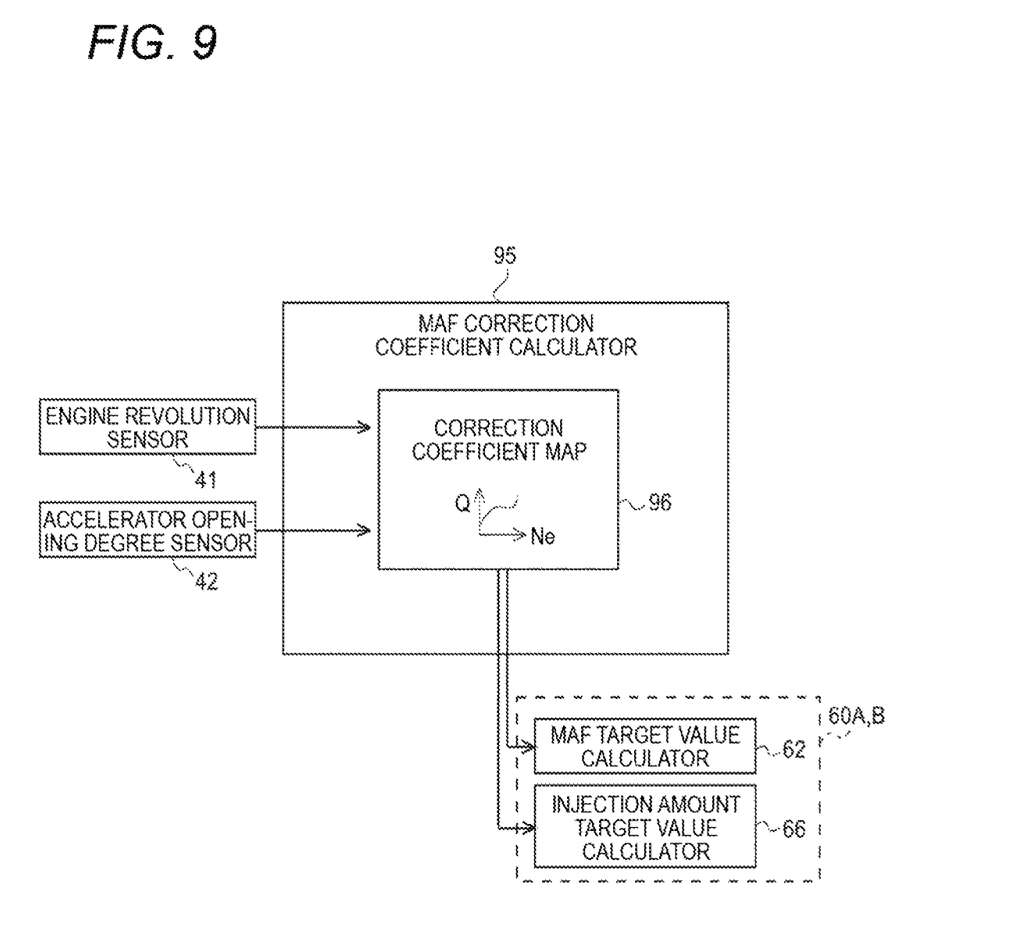
FIG. 9 is a block diagram depicting MAF correction coefficient setting processing according to the embodiment.

The MAF correction coefficient calculator 95 calculates an MAF correction coefficient $Maf_{corr}$, which is to be used for the setting of the MAF target value $MAF_{NPL\_Trgt}$ and the target injection amount $Q_{NPR\_Trgt}$ upon the NOx purge control.

In the embodiment, the fuel injection amount of each in-cylinder injector 11 is corrected based on the error $\Delta\lambda$ between the actual lambda value $\lambda_{Act}$ detected at the NOx/lambda sensor 45 and the estimated lambda value $\lambda_{Est}$. However, since the lambda is a ratio of air and fuel, it cannot be said that the error $\Delta\lambda$ is necessarily caused due to the difference between the instructed injection amount to each in-cylinder injector 11 and the actual injection amount. That is, the error $\Delta\lambda$ of the lambda may be influenced not only by each in-cylinder injector 11 but also an error of the MAF sensor 40.

FIG. 9 is a block diagram depicting setting processing of the MAF correction coefficient $Maf_{corr}$, which is to be performed by the MAF correction coefficient calculator 95. A correction coefficient setting map 96 is a map that is to be referred to based on the engine revolution Ne and the accelerator opening degree Q, and an MAF correction coefficient $Maf_{corr}$ indicative of a sensor characteristic of the MAF sensor 40 corresponding to the engine revolution Ne and the accelerator opening degree Q is set in advance by a test and the like.

The MAF correction coefficient calculator 95 reads the MAF correction coefficient $Maf_{corr}$ from the correction coefficient setting map 96, in response to the engine revolution Ne and the accelerator opening degree Q, which are input signals, and transmits the MAF correction coefficient $Maf_{corr}$ to the MAF target value calculator 62 and the injection amount target value calculator 66. Thereby, it is possible to effectively reflect the sensor characteristics of the MAF sensor 40 when setting the MAF target value $MAF_{NPL\_Trgt}$ and the target injection amount $Q_{NPR\_Trgt}$ upon the NOx purge control.

[Others]

In the meantime, the present invention is not limited to the above embodiment and can be performed with being appropriately modified without departing from the spirit of the present invention.

The subject application is based on a Japanese Patent Application No. 2015-007988 filed on Jan. 19, 2015, the entire contents of which are incorporated herein by reference.

INDUSTRIAL APPLICABILITY

The exhaust purification system and the catalyst regeneration method of the present invention are useful in that it is possible to effectively prevent the deterioration of fuel consumption by inhibiting the performance of NOx purge in correspondence to the reachable lambda which is estimated from the maximum limit injection amount of the exhaust injector.

REFERENCE SIGNS LIST

10: engine
11: in-cylinder injector
12: intake passage
13: exhaust passage

16: intake throttle valve
24: EGR valve
31: oxidation catalyst
32: NOx-occlusion-reduction-type catalyst
33: filter
34: exhaust injector
40: MAF sensor
45: NOx/lambda sensor
50: ECU

The invention claimed is:

1. An exhaust purification system comprising:
a NOx-occlusion-reduction-type catalyst that is provided in an exhaust passage of an internal combustion engine, occludes NOx in exhaust when the exhaust is in a lean state, and reduces and purifies the occluded NOx when the exhaust is in a rich state;
an exhaust injector that is provided to the exhaust passage, is positioned further upstream than the NOx-occlusion-reduction-type catalyst, and injects fuel into the exhaust passage; and
an electronic control unit (ECU), wherein the ECU:
   performs catalyst regeneration processing of reducing and purifying the NOx occluded in the NOx-occlusion-reduction-type catalyst by lowering a lambda value of the exhaust to a predetermined target lambda at least by fuel injection by the exhaust injector;
   inhibits performance of the catalyst regeneration processing in a case where the lambda value of the exhaust cannot be lowered to the target lambda even if the fuel injection is performed at a maximum limit injection amount of the exhaust injector; and
   estimates a reachable exhaust lambda based on the maximum limit injection amount of the exhaust injector and inhibits the catalyst regeneration processing by the ECU in a case where the estimated reachable exhaust lambda is greater than the target lambda.

2. An exhaust purification system comprising:
a NOx-occlusion-reduction-type catalyst that is provided in an exhaust passage of an internal combustion engine, occludes NOx in exhaust when the exhaust is in a lean state, and reduces and purifies the occluded NOx when the exhaust is in a rich state;
an exhaust injector that is provided to the exhaust passage, is positioned further upstream than the NOx-occlusion-reduction-type catalyst, and injects fuel into the exhaust passage, and
a control unit,
wherein the control unit operates so as to execute the following processing:
   reducing and purifying the NOx occluded in the NOx-occlusion-reduction-type catalyst by lowering a lambda value of the exhaust to a predetermined target lambda at least by fuel injection by the exhaust injector;
   inhibiting performance of the catalyst regeneration processing by the control unit in a case where the lambda value of the exhaust cannot be lowered to the target lambda even if the fuel injection is performed at a maximum limit injection amount of the exhaust injector; and
   estimating a reachable exhaust lambda based on the maximum limit injection amount of the exhaust injector and inhibits the catalyst regeneration processing by the ECU in a case where the estimated reachable exhaust lambda is greater than the target lambda.

3. A catalyst regeneration method in an exhaust purification system including: an internal combustion engine; a NOx-occlusion-reduction-type catalyst that is provided in an exhaust passage of the internal combustion engine and occludes NOx in exhaust when the exhaust is in a lean state, and reduces and purifies the occluded NOx when the exhaust is in a rich state; and an exhaust injector that is provided to the exhaust passage, is positioned further upstream than the NOx-occlusion-reduction-type catalyst, and injects fuel into the exhaust passage, the method comprising:
   reducing and purifying the NOx occluded in the NOx-occlusion-reduction-type catalyst by lowering a lambda value of the exhaust to a predetermined target lambda at least by fuel injection by the exhaust injector;
   inhibiting performance of the catalyst regeneration processing by the control unit in a case where the lambda value of the exhaust cannot be lowered to the target lambda even if the fuel injection is performed at a maximum limit injection amount of the exhaust injector; and
   estimating a reachable exhaust lambda based on the maximum limit injection amount of the exhaust injector and inhibits the catalyst regeneration processing by the ECU in a case where the estimated reachable exhaust lambda is greater than the target lambda.

* * * * *